United States Patent
Nammoto et al.

(10) Patent No.: US 8,977,392 B2
(45) Date of Patent: Mar. 10, 2015

(54) ROBOT CONTROL DEVICE, ROBOT CONTROL METHOD, ROBOT CONTROL PROGRAM, AND ROBOT SYSTEM

(71) Applicant: Seiko Epson Corporation, Tokyo (JP)

(72) Inventors: Takashi Nammoto, Sendai (JP); Kazuhiro Kosuge, Sendai (JP); Kentaro Kamei, Sendai (JP)

(73) Assignee: Seiko Epson Corporation (JP)

( * ) Notice: Subject to any disclaimer, the term of this patent is extended or adjusted under 35 U.S.C. 154(b) by 85 days.

(21) Appl. No.: 13/768,518

(22) Filed: Feb. 15, 2013

(65) Prior Publication Data

US 2013/0218331 A1 Aug. 22, 2013

(30) Foreign Application Priority Data

Feb. 16, 2012 (JP) ................................ 2012-031848

(51) Int. Cl.
*G06F 19/00* (2011.01)
*B25J 9/16* (2006.01)

(52) U.S. Cl.
CPC ..... *B25J 9/1643* (2013.01); *G05B 2219/39414* (2013.01); *G05B 2219/40367* (2013.01)
USPC ...................... 700/245; 318/568.12

(58) Field of Classification Search
CPC ... B62D 57/032; B25J 9/1612; A61B 19/081; A61B 19/2203; A61B 19/5212
USPC ................... 700/245; 318/568.12; 901/1, 2, 9
See application file for complete search history.

(56) References Cited

U.S. PATENT DOCUMENTS

| | | | | |
|---|---|---|---|---|
| 5,008,832 A | * | 4/1991 | Torii et al. ..................... | 700/254 |
| 7,072,740 B2 | * | 7/2006 | Iribe et al. ..................... | 700/245 |
| 7,386,364 B2 | * | 6/2008 | Mikami et al. ................ | 700/245 |
| 7,756,606 B2 | | 7/2010 | Nakajima et al. | |
| 8,041,457 B2 | * | 10/2011 | Ohno ............................ | 700/259 |
| 8,260,457 B2 | * | 9/2012 | Yokoyama .................... | 700/245 |
| 8,560,122 B2 | * | 10/2013 | Park et al. ..................... | 700/262 |

(Continued)

FOREIGN PATENT DOCUMENTS

| | | |
|---|---|---|
| JP | 05-050386 | 3/1993 |
| JP | 06-143172 | 5/1994 |

(Continued)

OTHER PUBLICATIONS

Masayuki Shimizu et al., "Analytical Inverse Kinematic Computation for 7-DOF Redundant Manipulators With Joint Limits and Its Application to Redundancy Resolution", IEEE Transactions on Robotics, vol. 24, No. 5, Oct. 2008, pp. 1131-1142.

*Primary Examiner* — McDieunel Marc
(74) *Attorney, Agent, or Firm* — Harness, Dickey & Pierce, P.L.C.

(57) ABSTRACT

A robot control device of a vertical articulated robot having seven axes and an offset structure includes: a storage unit which stores a condition of a status of the vertical articulated robot including a position of an elbow in the vertical articulated robot and control information for controlling the vertical articulated robot such that the condition is satisfied to match each other; an input unit to which the condition of the status of the vertical articulated robot including the position of the elbow is input; and a robot control unit which controls the vertical articulated robot such that the input condition is satisfied on the basis of the control information stored in the storage unit to match the same condition as the condition input to the input unit.

11 Claims, 6 Drawing Sheets

(56) References Cited

U.S. PATENT DOCUMENTS

| | | | |
|---|---|---|---|
| 2004/0176875 A1* | 9/2004 | Iribe et al. | 700/245 |
| 2005/0055131 A1* | 3/2005 | Mikami et al. | 700/245 |
| 2005/0228540 A1* | 10/2005 | Moridaira | 700/245 |
| 2008/0133058 A1* | 6/2008 | Ohno | 700/259 |
| 2008/0240889 A1* | 10/2008 | Yokoyama | 414/1 |
| 2009/0149993 A1* | 6/2009 | Neki et al. | 700/254 |

FOREIGN PATENT DOCUMENTS

| | | |
|---|---|---|
| JP | 07-132474 | 5/1995 |
| JP | 2005-193311 | 7/2005 |

* cited by examiner

ROBOT CONTROL DEVICE, ROBOT CONTROL METHOD, ROBOT CONTROL PROGRAM, AND ROBOT SYSTEM

BACKGROUND

1. Technical Field

The present invention relates to a robot control device, a robot control method, a robot control program, and a robot system.

2. Related Art

In order to control an arbitrary position and a posture of a hand of a robot, the robot needs to have at least 6 axes of motion. Moreover, the robot needs to include at least 7 axes of motion to avoid a singular point or an obstacle when an arbitrary position and a posture of the hand of the robot are controlled.

JP-A-2005-193311 discloses a method of controlling a robot including 7 axes. The control method includes numerically obtaining a redundant axis that is rotated to avoid a singular point and the rotational amount thereof is controlled using an iterative method.

JP-A-7-132474 discloses another method of controlling a robot including 7 axes. This control method includes automatically selecting at least one of the 7 axes as an axis for avoiding a singular point (so as to be regarded as a 6-axis robot), and solutions that define joint angles corresponding to the position and the posture of the hand are analytically obtained by inverse kinematics. Thus, the amount of calculations is reduced and the robot may be operated at high speed.

However, in the method of controlling a robot described in JP-A-2005-193311, since the iterative method is used, there are problems in that there is a large amount of calculations and thus it is difficult to operate the robot at high speed.

In addition, in the method of controlling a robot described in JP-A-7-132474, there are problems in that the position corresponding to an elbow may not be explicitly designated and instructions for an operation of intuitively avoiding an obstacle may not be performed. Further, an axis corresponding to the shoulder may not be defined, and thus there is a problem in that the method may not be applied to a robot including an offset structure between, for example, a first axis and a second axis.

SUMMARY

An advantage of some aspects of the invention is that it provides a robot control device capable of controlling a vertical articulated robot having seven axes and an offset structure by explicitly designating the position of an elbow, a robot control method, a robot control program, and a robot system.

An aspect of the invention is directed to a robot control device including: a storage unit which stores a condition of a status of a vertical articulated robot including a position of an elbow in the vertical articulated robot having 7 axes and an offset structure and control information for controlling the vertical articulated robot such that the condition is satisfied to match each other; an input unit to which the condition of the status of the vertical articulated robot including the position of the elbow is input; and a robot control unit which controls the vertical articulated robot such that the input condition is satisfied on the basis of the control information stored in the storage unit to match the same condition as the condition input to the input unit.

In this configuration, the robot control unit controls the vertical articulated robot according to instructions for the condition of the status including the position of the elbow for the vertical articulated robot (hereinafter, simply referred to as a "robot") having the 7 axes and the offset structure such that the condition is satisfied. Accordingly, it is possible for the robot control device to control the vertical articulated robot having the 7 axes and the offset structure by explicitly designating the position of the elbow.

In the robot control device, the condition of the status of the vertical articulated robot including the position of the elbow may be a condition that designates a position and a posture of a hand and the position of the elbow in the vertical articulated robot.

In this configuration, the robot control unit controls the vertical articulated robot according to the instructions for the condition that designates the position and the posture of the hand and the position of the elbow for the vertical articulated robot having the 7 axes and the offset structure such that the condition is satisfied. Accordingly, it is possible for the robot control device to control the vertical articulated robot having the 7 axes and the offset structure by explicitly designating the position of the elbow.

In the robot control device, the control information may be information for controlling each of the rotating axes and each of the turning axes of the vertical articulated robot.

In this configuration, the robot control unit controls each of the rotating axes and each of the turning axes of the vertical articulated robot according to the instructions for the condition of the status including the position of the elbow for the vertical articulated robot having the 7 axes and the offset structure such that the condition is satisfied. Accordingly, it is possible for the robot control device to control the vertical articulated robot having the 7 axes and the offset structure by explicitly designating the position of the elbow.

In the robot control device, the vertical articulated robot may include the offset structure between a first axis of the vertical articulated robot and a second axis of the vertical articulated robot.

In this configuration, the robot control unit controls the vertical articulated robot according to the instructions for the condition of the status including the position of the elbow for the vertical articulated robot having the 7 axes and the offset structure between the first axis and the second axis such that the condition is satisfied. Accordingly, it is possible for the robot control device to control the vertical articulated robot having the 7 axes and the offset structure by explicitly designating the position of the elbow.

In the robot control device, the vertical articulated robot may include the offset structure between a sixth axis of the vertical articulated robot and a seventh axis of the vertical articulated robot.

In this configuration, the robot control unit controls the vertical articulated robot according to the instructions for the condition of the status including the position of the elbow for the vertical articulated robot having the 7 axes and the offset structure between the sixth axis and the seventh axis such that the condition is satisfied. Accordingly, it is possible for the robot control device to control the vertical articulated robot having the 7 axes and the offset structure by explicitly designating the position of the elbow.

Another aspect of the invention is directed to a robot control method including: with reference to control information stored in a storage unit which stores a condition of a status of a vertical articulated robot including a position of an elbow in the vertical articulated robot having 7 axes and an offset structure and the control information for controlling the vertical articulated robot such that the condition is satisfied so as to match each other, controlling the vertical articulated robot such that the input condition is satisfied according to the condition input to an input unit to which the condition of the status of the vertical articulated robot including the position of the elbow is input, on the basis of the control information stored in the storage unit to match the same condition as the input condition, by a robot control unit.

In this method, the robot control unit controls the vertical articulated robot according to instructions for the condition of the status including the position of the elbow for the vertical articulated robot having the 7 axes and the offset structure such that the condition is satisfied. Accordingly, it is possible for the robot control device to control the vertical articulated robot having the 7 axes and the offset structure by explicitly designating the position of the elbow.

Still another aspect of the invention is directed to a robot control program which causes a computer to execute: with reference to control information stored in a storage unit which stores a condition of a status of a vertical articulated robot including a position of an elbow in the vertical articulated robot having 7 axes and an offset structure and the control information for controlling the vertical articulated robot such that the condition is satisfied so as to match each other, controlling the vertical articulated robot such that the input condition is satisfied according to the condition input to an input unit to which the condition of the status of the vertical articulated robot including the position of the elbow is input, on the basis of the control information stored in the storage unit to match the same condition as the input condition, by a robot control unit.

In this program, the robot control unit controls the vertical articulated robot according to instructions for the condition of the status including the position of the elbow for the vertical articulated robot having the 7 axes and the offset structure such that the condition is satisfied. Accordingly, it is possible for the robot control device to control the vertical articulated robot having the 7 axes and the offset structure by explicitly designating the position of the elbow.

Yet another aspect of the invention is directed to a robot system including: a vertical articulated robot having 7 axes and an offset structure; and a robot control device which controls the vertical articulated robot, wherein the robot control device includes a storage unit which stores a condition of a status of the vertical articulated robot including a position of an elbow in the vertical articulated robot and control information for controlling the vertical articulated robot such that the condition is satisfied to match each other, an input unit to which the condition of the status of the vertical articulated robot including the position of the elbow is input, and a robot control unit which controls the vertical articulated robot such that the input condition is satisfied on the basis of the control information stored in the storage unit to match the same condition as the condition input to the input unit.

In this system, the robot control unit of the robot control device controls the vertical articulated robot according to instructions for the condition of the status including the position of the elbow for the vertical articulated robot having the 7 axes and the offset structure such that the condition is satisfied. Accordingly, it is possible for the robot control device to control the vertical articulated robot having the 7 axes and the offset structure by explicitly designating the position of the elbow.

Still yet another aspect of the invention is directed to a robot control device including: an input unit to which a condition of a status of a vertical articulated robot including a position of an elbow in the vertical articulated robot having 7 axes and an offset structure is input; and a robot control unit which controls the vertical articulated robot such that the condition input to the input unit is satisfied.

In this configuration, the robot control unit controls the vertical articulated robot according to instructions for the condition of the status including the position of the elbow for the vertical articulated robot having the 7 axes and the offset structure such that the condition is satisfied. Accordingly, it is possible for the robot control device to control the vertical articulated robot having the 7 axes and the offset structure by explicitly designating the position of the elbow.

Further another aspect of the invention is directed to a robot control method including: controlling a vertical articulated robot such that a condition input to an input unit to which the condition of a status of the vertical articulated robot including a position of an elbow in the vertical articulated robot having 7 axes and an offset structure is input is satisfied, by a robot control unit.

In this method, the robot control unit controls the vertical articulated robot according to instructions for the condition of the status including the position of the elbow for the vertical articulated robot having the 7 axes and the offset structure such that the condition is satisfied. Accordingly, it is possible for a robot control device to control the vertical articulated robot having the 7 axes and the offset structure by explicitly designating the position of the elbow.

Still further another aspect of the invention is directed to a robot control program which causes a computer to execute: controlling a vertical articulated robot such that a condition input to an input unit to which the condition of a status of the vertical articulated robot including a position of an elbow in the vertical articulated robot having 7 axes and an offset structure is input is satisfied, by a robot control unit.

In this method, the robot control unit controls the vertical articulated robot according to instructions for the condition of the status including the position of the elbow for the vertical articulated robot having the 7 axes and the offset structure such that the condition is satisfied. Accordingly, it is possible for a robot control device to control the vertical articulated robot having the 7 axes and the offset structure by explicitly designating the position of the elbow.

Yet further another aspect of the invention is directed to a robot system including: a vertical articulated robot having 7 axes and an offset structure; and a robot control device which controls the vertical articulated robot, wherein the robot control device includes an input unit to which a condition of a status of the vertical articulated robot including a position of an elbow in the vertical articulated robot is input, and a robot control unit which controls the vertical articulated robot such that the condition input to the input unit is satisfied.

In this system, the robot control unit controls the vertical articulated robot according to instructions for the condition of the status including the position of the elbow for the vertical articulated robot having the 7 axes and the offset structure such that the condition is satisfied. Accordingly, it is possible for the robot control device to control the vertical articulated robot having the 7 axes and the offset structure by explicitly designating the position of the elbow.

As described above, according to the aspects of the invention, the robot control device controls the vertical articulated robot according to the instructions for the condition of the status including the position of the elbow for the vertical articulated robot having the 7 axes and the offset structure such that the condition is satisfied. Accordingly, it is possible for the robot control device to control the vertical articulated robot having the 7 axes and the offset structure by explicitly designating the position of the elbow.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will be described in detail with reference to the drawings.

Figure 1:
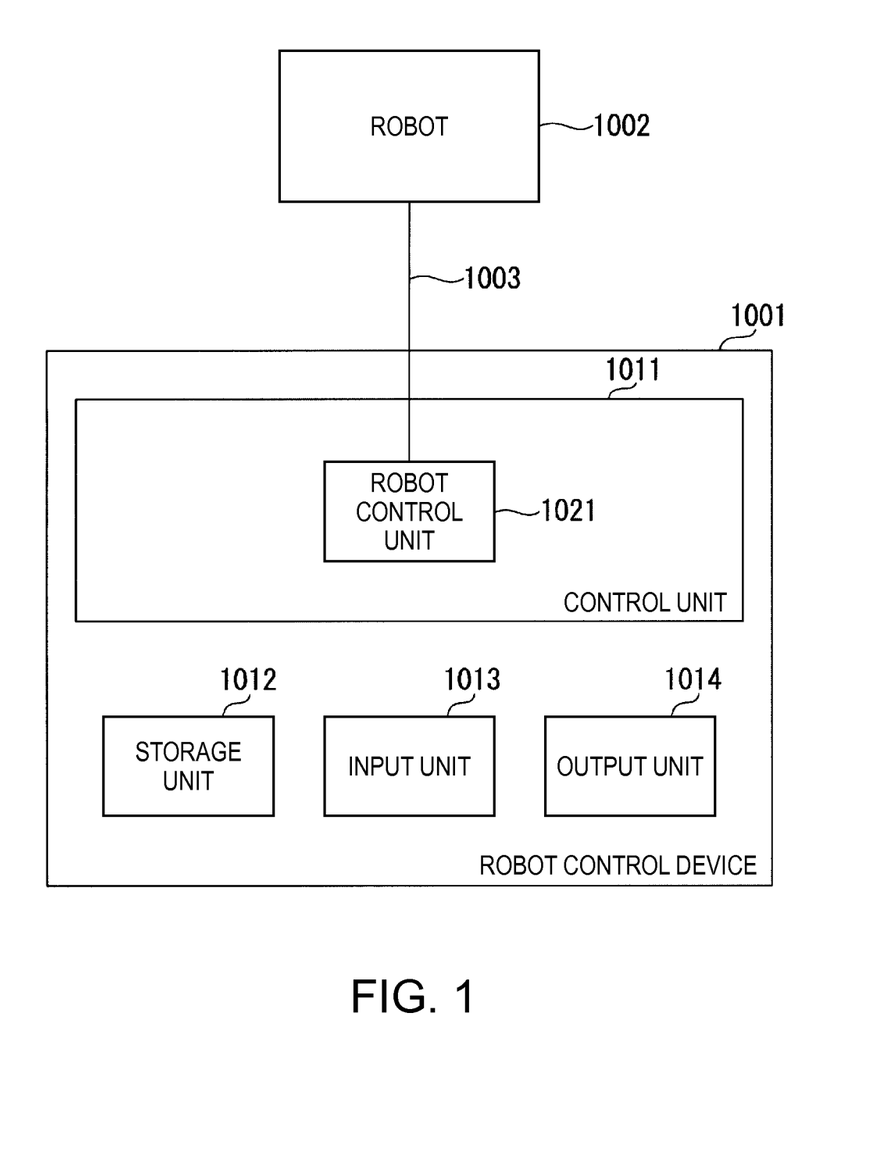
FIG. 1 is a schematic block diagram illustrating a configuration example of a robot system including a robot control device according to an embodiment of the invention.

FIG. 1 is a schematic block diagram illustrating a configuration example of a robot system including a robot control device 1001 according to an embodiment of the invention.

The robot system according to this embodiment includes the robot control device 1001, a robot 1002, and a wire cable 1003.

The robot control device 1001 and the robot 1002 are connected via the wire cable 1003 so as to communicate with each other. If desired, instead of the wire cable 1003, a wireless connection may also be used.

The robot control device 1001 includes a control unit 1011, a storage unit 1012, an input unit 1013, and an output unit 1014.

The control unit 1011 includes a robot control unit 1021.

The input unit 1013 is configured using, for example, a keyboard or a mouse operated by a user (person) and receives contents through operation by the user.

The output unit 1014 is configured using, for example, a liquid crystal screen that displays information and displays and outputs various types of information for the user.

The storage unit 1012 stores various types of information. The storage unit 1012 stores, for example, information such as programs used by the control unit 1011 and information such as numerical values used for various processes.

The control unit 1011 is configured using, for example, a CPU (Central Processing Unit) and controls various processes in the robot control device 1001. The control unit 1011 has, for example, a function of executing a process in response to the contents of the operation by the user received by the input unit 1013, a function of allowing the screen of the output unit 1012 to display various types of information, a function of reading information stored in the storage unit 1012, and a function of writing information (to be stored) to the storage unit 1012.

The robot control unit 1021 corresponds to a part of the functions included in the control unit 1011.

The robot control unit 1021 controls the robot 1002 by transmitting a signal for control (control signal) to the robot 1002 via the cable 1003.

In addition, the robot control unit 1021 is able to receive a signal transmitted from the robot 1002 via the cable 1003.

In this embodiment, as the robot 1002, a manipulator which is an example of a vertical articulated robot is used.

The robot 1002 receives the control signal transmitted from the robot control unit 1021 of the robot control device 1001 via the cable 1003 and is controlled by the received control signal.

In addition, the robot 1002 may also have a function of transmitting a signal indicating its own status to the robot control unit 1021 of the robot control device 1001 via the cable 1003.

Here, specifically, the robot 1002 may be applied to various fields. For example, the robot 1002 is able to not only be configured as an industrial robot but may also be applied to robots in various fields including aerospace applications, play tools, and the like.

Figure 2:
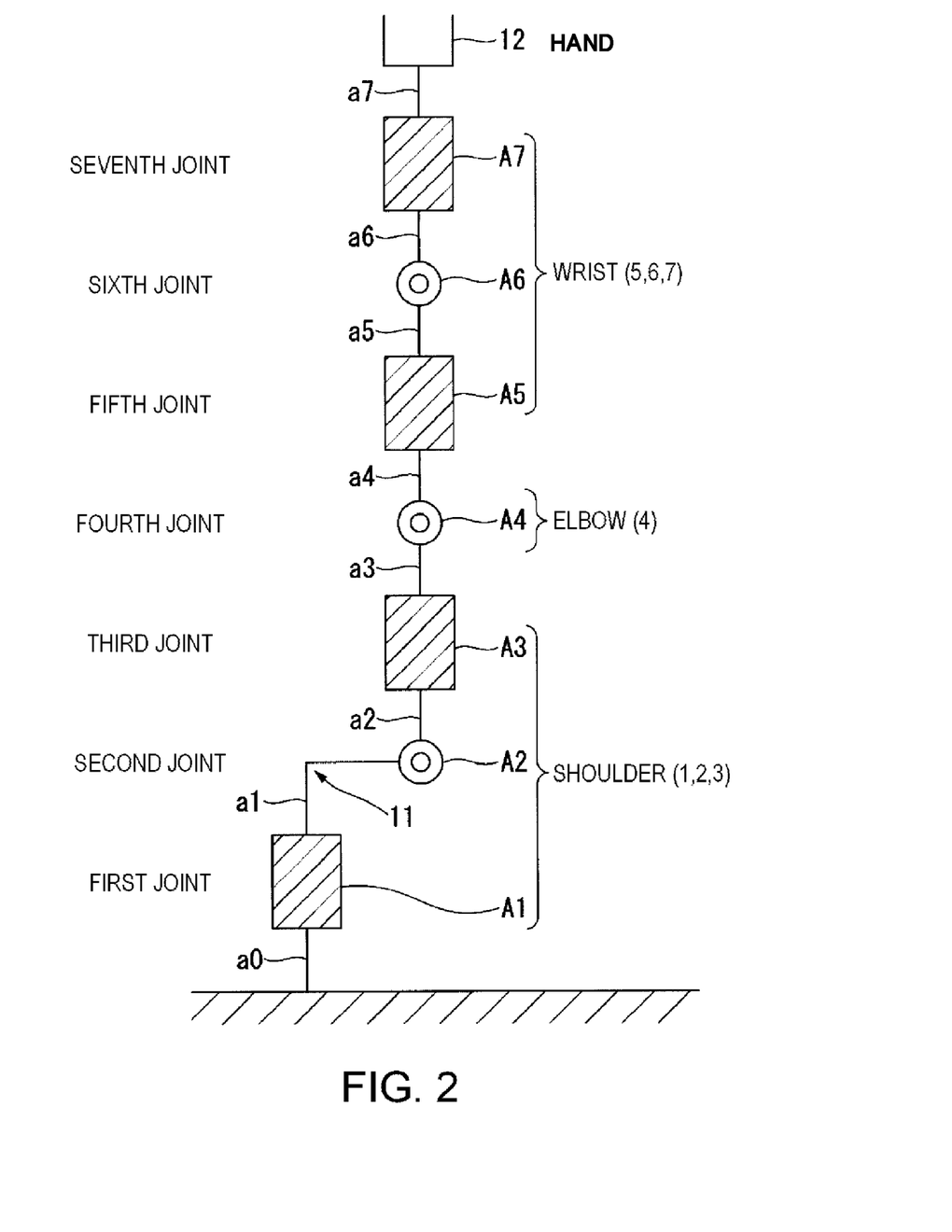
FIG. 2 is a schematic block diagram illustrating a configuration example of a 7-axis robot having an offset structure according to the first embodiment.

FIG. 2 is a schematic block diagram illustrating a configuration example of the 7-axis (7 degrees of freedom) robot 1002 having an offset structure according to this embodiment.

The robot 1002 according to this embodiment is configured by connecting a base a0, a rotating axis A1 corresponding to a first joint, a first link a1, a turning axis A2 corresponding to a second joint, a second link a2, a rotating axis A3 corresponding to a third joint, a third link a3, a turning axis A4 corresponding to a fourth joint, a fourth link a4, a rotating axis A5 corresponding to a fifth joint, a fifth link a5, a turning axis A6 corresponding to a sixth joint, a sixth link a6, a rotating axis A7 corresponding to a seventh joint, a seventh link a7, and a hand 12.

The first joint, the second joint, and the third joint constitute a part of the shoulder.

The fourth joint constitutes a part of the elbow.

The fifth joint, the sixth joint, and the seventh joint constitute a part of the wrist.

In this embodiment, a part from the root of the shoulder to the hand 12 is referred to as an "arm".

Here, the base a0 and each of the links a1 to a7 are stationary.

In addition, the base a0, the second link a2, the third link a3, the fourth link a4, the fifth link a5, the sixth link a6, and the seventh link a7 have linear shapes.

In addition, in this embodiment, the first link a1 has a shape bent at approximately 90 degrees at one point. This part is an offset portion 11 having an offset structure. The offset structure is a structure in which the rotation center axis lines of a rotating axis and a turning axis which are adjacent to each other do not intersect each other. As in the configuration described above, the shape is not limited to the shape bent at 90 degrees.

Each of the rotating axes A1, A3, A5, and A7 is able to rotate about a straight line connecting the links above and below in FIG. 2 as a center axis.

Each of the turning axes A2, A4, and A6 is able to turn (rotate) about a straight line from the front to the rear (or a straight line from the rear to the front) in FIG. 2 as a center axis.

In addition, the center axis (turning axis) of each of the turning axes A2, A4, and A6 is orthogonal to the center axis (rotational axis) of each of the rotating axes A1, A3, A5, and A7.

When all the angles (7 angles) of the rotating axes A1, A3, A5, and A7 and the turning axes A2, A4, and A6 are determined, the entire status of the robot 1002 is determined.

Here, variables (parameters) that control the robot 1002 are not necessarily the 7 angles, and arbitrary variables that directly or indirectly specify all the 7 angles may be used.

In this embodiment, a control method of controlling the angles of the rotating axes A1, A3, A5, and A7 and the turning axes A2, A4, and A6 of the robot 1002 to meet instructions for the position and the posture (6 variables) of the hand 12 of the robot 1002 and instruction for the position (a single variable) corresponding to the elbow is used.

Here, the vertical articulated robot including the offset structure according to this embodiment has 7 joints like humans do. In addition, the fourth joint constitutes the elbow. In this embodiment, the position corresponding to an elbow of a human in the vertical articulated robot is regarded as the position of the elbow in the corresponding vertical articulated robot.

Specifically, in the robot control device 1001, in advance, conditions of the status of the vertical articulated robot in accordance with the instructions for the position and the posture of the hand 12 of the robot 1002 and the instructions for the position corresponding to the elbow, and information (control information) for controlling the angles of the rotating axes A1, A3, A5, and A7 and the turning axes A2, A4, and A6 of the robot 1002 to meet the conditions are stored in the storage unit 1012 to match each other.

The robot control unit 1021 controls the angles of the rotating axes A1, A3, A5, and A7 and the turning axes A2, A4, and A6 of the robot 1002 according to the instructions for the position and the posture of the hand 12 of the robot 1002 and the instructions for the position corresponding to the elbow on the basis of the control information stored in the storage unit 1012 so as to meet the conditions of the status of the vertical articulated robot in accordance with the instructions.

In addition, as an example, in the storage unit 1012, for each of a plurality of different statuses of the vertical articulated robot, the conditions of the statuses of the vertical articulated robot and the information (control information) for controlling the robot 1002 such that the conditions are met are stored to match each other. In addition, the robot control unit 1021 selects control information that meets the conditions of the status of the vertical articulated robot according to the instructions from among the group of the control information items stored in the storage unit 1012 and uses the selected control information to control the robot 1002.

Here, the instructions for the position and the posture of the hand 12 of the robot 1002 and the instructions for the position corresponding to the elbow are received from the user by the input unit 1013, as an example. Accordingly, the input unit 1013 receives the conditions of the status of the vertical articulated robot in accordance with the instructions from the user. The instructions may be received, for example, using numerical values, or a joystick or the like for operating the robot 1002 may be included in the input unit 1013 to receive the instructions on the basis of the movement of the corresponding joystick or the like operated by the user.

In addition, as another example, regarding the instructions for the position and the posture of the hand 12 of the robot 1002 and the instructions for the position corresponding to the elbow, a part or the entirety thereof may be automatically acquired by the robot control device 1001. Specifically, in the robot control device 1001, for example, the position or the like of a component or the like that is an object of operation performed by the robot 1002 is detected by a sensor, and on the basis of the detection result, a part or the entirety of the instructions for the position and the posture of the hand 12 of the robot 1002 and the instructions for the position corresponding to the elbow may be generated.

Here, the entire status of the robot 1002 may be analytically calculated and determined from the position and the posture of the hand 12 of the robot 1002 and the position corresponding to the elbow by inverse kinematics.

The summary of the order of calculation in inverse kinematics (a calculation order 1 in inverse kinematics to a calculation order 4 in inverse kinematics) will be described.

In this embodiment, base coordinates are expressed as coordinates (x, y, z) of an XYZ coordinate system which is an orthogonal right-handed coordinate system. In addition, a position vector p (p is provided with an arrow indicating a vector in the figures and formulas, and the same applies hereinafter) of the hand 12 is designated at a position in the X-axis, the Y-axis, and the Z-axis in the base coordinates.

The posture of the hand 12 is represented by a unit vector b (b is provided with an arrow indicating a vector in the figures and formulas, and the same applies hereinafter) having the same direction as the rotational axis of the seventh axis, a unit vector n (n is provided with an arrow indicating a vector in the figures and formulas, and the same applies hereinafter) orthogonal to the vector b, and a unit vector t (t is provided with an arrow indicating a vector in the figures and formulas, and the same applies hereinafter) that is orthogonal to the vector b and the vector n and constitutes the right-handed coordinate system with the vectors.

Moreover, an offset angle value $\delta$ which is a variable that designates the posture of the entirety of the robot 1002 (in this embodiment, a manipulator) is designated. The offset angle value $\delta$ designates the position corresponding to the elbow.

In addition, the angle of each of the joints is calculated from the position and the posture of the hand 12 and the offset angle value $\delta$.

Figure 6:
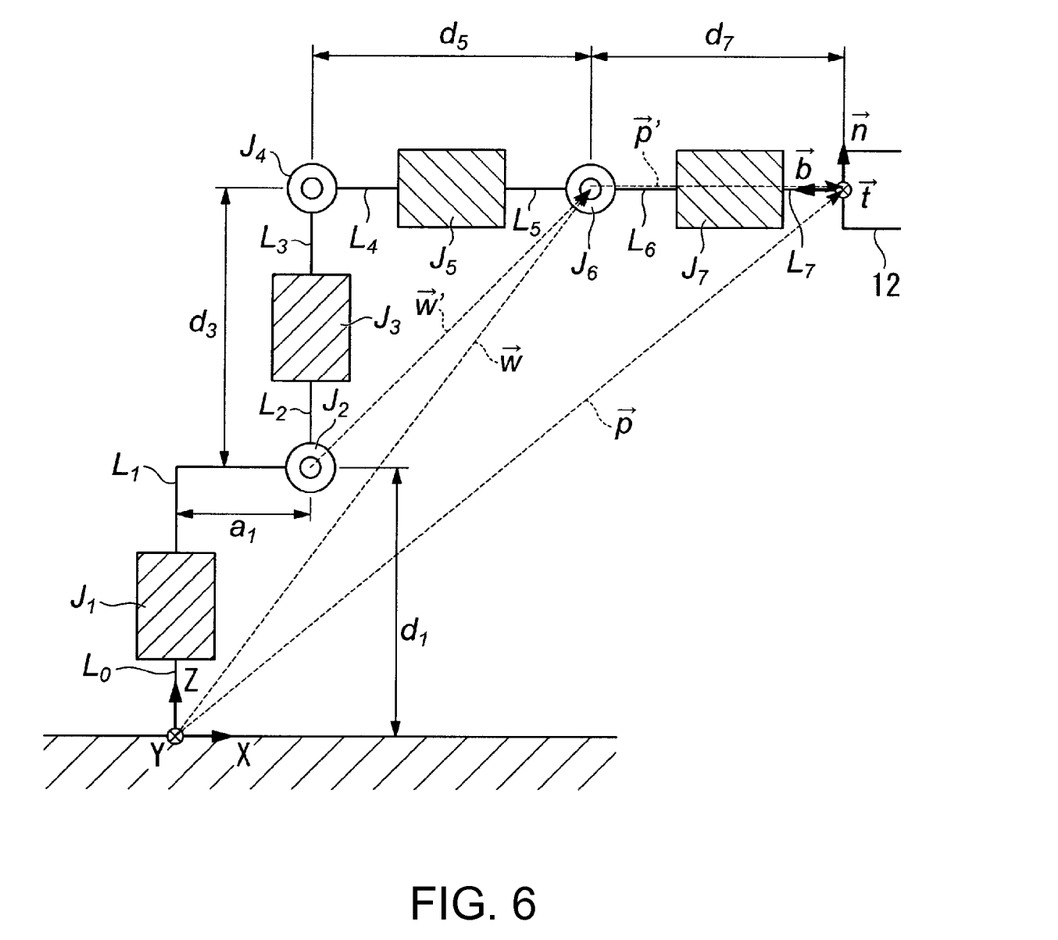
FIG. 6 is a diagram illustrating a calculation order in inverse kinematics.

Hereinafter, the calculation order will be described in detail with reference to FIG. 6. In FIG. 6, $L_0$, $L_1$, $L_2$, $L_3$, $L_4$, $L_5$, $L_6$, and $L_7$ are links that connect joints and joints and a joint and a hand. In addition, $J_1$, $J_2$, $J_3$, $J_4$, $J_5$, $J_6$, and $J_7$ are joints that cause the links to rotate. Furthermore, $a_1$ is the length from a perpendicular line that comes down from the extension line of the rotating axis of the first joint $J_1$ to the center of the rotating axis of the second joint $J_2$, $d_1$ is the distance between a point of intersection between the extension line of the rotating axis of the first joint $J_1$ to a perpendicular line that comes out from the center of the rotating axis of the second joint $J_2$ to the extension line of the rotating axis of the first joint $J_1$ and the origin, $d_3$ is the distance between the second joint $J_2$ and the fourth joint $J_4$, $d_5$ is the distance between the fourth joint $J_4$ and the sixth joint $J_6$, and $d_7$ is the distance from the sixth joint $J_6$ to the hand 12.

Here, as illustrated in FIG. 6, the position vector p of the hand 12 is expressed by Expression (1), and each joint angle when the vector n, the vector t, and the vector b are at a predetermined posture is assumed to be 0 degrees.

$$\vec{p} = [a_1 + d_5 + d_7 0 d_1 + d_3]T \quad (1)$$

Calculation Order 1 in Inverse Kinematics

Initially, the center of the sixth joint is defined as the wrist, and a position vector w (w is provided with an arrow indicating a vector in the figures and formulas, and the same applies hereinafter) of the wrist in the base coordinates is calculated by Expression (2) from the designated position of the hand 12 and the relative position and posture between the hand 12 and the sixth joint $J_6$.

$$\vec{w} = \vec{p} + d_7 \vec{b} \quad (2)$$

Subsequently, an angle from the X axis is obtained from the x component and the y component of the calculated position of the wrist, and the angle of the first joint is calculated by Expression (3) by adding the offset angle value $\delta$ thereto.

Here, from the geometrical symmetry, Expression (4) may also express the angle of the first joint $J_1$. Here, in an actual control process, the angle is appropriately selected to command the robot.

$$\theta_1[1] = \arctan\frac{w_y}{w_x} + \delta \quad (3)$$

-continued $$\theta_1[2] = \arctan\frac{w_y}{w_x} + \delta + \pi \quad (4)$$

Calculation Order 2 in Inverse Kinematics

Using the obtained angle of the first joint, a position vector w' (w' is provided with an arrow indicating a vector in the figures and formulas, and the same applies hereinafter) of the wrist in a case where the angle of the first joint $J_1$ is assumed to be 0 degrees and the center of the second joint $J_2$ is assumed to be the origin is calculated by Expression (5).

$$\vec{w}' = \begin{pmatrix} \cos(-\theta_1) & -\sin(-\theta_1) & 0 \\ \sin(-\theta_1) & \cos(-\theta_1) & 0 \\ 0 & 0 & 1 \end{pmatrix} \begin{pmatrix} w_x \\ w_y \\ w_z \end{pmatrix} + \begin{pmatrix} -a_1 \\ 0 \\ -d_1 \end{pmatrix} \quad (5)$$

$$= \begin{pmatrix} w_x\cos\theta_1 + w_y\sin\theta_1 - a_1 \\ -w_x\sin\theta_1 + w_y\cos\theta_1 \\ w_z - d_1 \end{pmatrix}$$

Next, the angles of the second joint $J_2$, the third joint $J_3$, and the fourth joint $J_4$ are calculated to reproduce the calculated position w' of the wrist.

First, the angle of the fourth joint $J_4$ is obtained by Expression (6) under the condition in which the vector w', $d_3$, and $d_5$ form a triangle.

$$|\vec{w}'|^2 = \left(d_5\sin\left(\frac{\pi}{2}-\theta_4\right)\right)^2 + \left(d_3 + d_5\cos\left(\frac{\pi}{2}-\theta_4\right)\right)^2 \quad (6)$$

$$= d_5^2 + d_3^2 + 2d_3d_5\sin\theta_4$$

$$\Rightarrow \theta_4[1] = \arcsin\left(\frac{|\vec{w}'|^2 - d_3^2 - d_5^2}{2d_3d_5}\right)$$

Next, the angle of the second joint $J_2$ is given by Expression (8) using the angle of the fourth joint $J_4$ in Expression (7).

$$\phi = \arctan\frac{w'_z}{w'_x} \quad (7)$$

$$\cos\left(\pi - \phi - \left(\frac{\pi}{2}-\theta_2\right)\right) = -\sin(\theta_2 - \phi)$$

$$= \frac{d_3 + d_5\cos\left(\frac{\pi}{2}-\theta_4\right)}{\sqrt{w'^2_x + w'^2_z}}$$

$$\sin(\theta_2 - \phi) = \frac{-d_3 - d_5\sin\theta_4}{\sqrt{w'^2_x + w'^2_z}}$$

$$\Rightarrow \theta_2[1] = \phi - \arcsin\left(\frac{d_3 + d_5\sin\theta_4}{\sqrt{w'^2_x + w'^2_z}}\right) \quad (8)$$

Furthermore, the angle of the third joint $J_3$ is given by Expression (9) using the angle of the second joint $J_2$.

$$\theta_3[1] = \arctan\left(\frac{w'_y}{w'_x\cos\theta_2 + w'_z\sin\theta_2}\right) \quad (9)$$

In addition, regarding $\theta_2$, $\theta_3$, and $\theta_4$, from the geometrical symmetry, the joint angles of the second joint $J_2$, the third joint $J_3$, and the fourth joint $J_4$ may be obtained also by Expressions (10) to (12), Expressions (13) to (15), and Expressions (16) to (18). Here, in the actual control process, the joint angles are appropriately selected to command the robot.

$$\theta_2[2] = \theta_2[1] \quad (10)$$

$$\theta_3[2] = \theta_3[1] - \pi \quad (11)$$

$$\theta_4[2] = \pi - \theta_4[1] \quad (12)$$

$$\theta_2[3] = 2\phi - \theta_3[1] - \pi \quad (13)$$

$$\theta_3[3] = -\theta_3[1] \quad (14)$$

$$\theta_4[3] = \pi - \theta_4[1] \quad (15)$$

$$\theta_2[4] = -\theta_2[3] \quad (16)$$

$$\theta_3[4] = -\theta_3[3] - \pi \quad (17)$$

$$\theta_4[4] = \pi - \theta_4[3] \quad (18)$$

Calculation Order 3 in Inverse Kinematics

Using the obtained angles of the first joint $J_1$, the second joint $J_2$, the third joint $J_3$, and the fourth joint $J_4$, the position of the hand 12 in a case where the angles of the first joint $J_1$, the second joint $J_2$, the third joint $J_3$, and the fourth joint $J_4$ are assumed to be 0 degrees and the center of the sixth joint $J_6$ is assumed to be the origin is calculated by Expression (19).

$$\vec{p}' = \begin{bmatrix} \cos\theta_4 & 0 & \sin\theta_4 \\ 0 & 1 & 0 \\ -\sin\theta_4 & 0 & \cos\theta_4 \end{bmatrix} \left\{ \begin{bmatrix} \cos(-\theta_3) & -\sin(-\theta_3) & 0 \\ \sin(-\theta_3) & \cos(-\theta_3) & 0 \\ 0 & 0 & 1 \end{bmatrix} \begin{bmatrix} \cos\theta_2 & 0 & \sin\theta_2 \\ 0 & 1 & 0 \\ -\sin\theta_2 & 0 & \cos\theta_2 \end{bmatrix} \begin{bmatrix} p_x\cos\theta_1 + p_y\sin\theta_1 - a_1 \\ -p_x\sin\theta_1 + p_y\cos\theta_1 \\ p_z - d_1 \end{bmatrix} + \begin{bmatrix} 0 \\ 0 \\ -d_3 \end{bmatrix} \right\} + \begin{bmatrix} -d_5 \\ 0 \\ 0 \end{bmatrix} = \quad (19)$$

$$\begin{bmatrix} \cos\theta_4 \begin{array}{c} [\cos\theta_3\{\cos\theta_2(p_x\cos\theta_1 + p_y\sin\theta_1 - a_1) + \\ \sin\theta_2(p_z - d_1)\} + \\ \sin\theta_3(-p_x\sin\theta_1 + p_y\cos\theta_1)] \end{array} + \sin\theta_4 \begin{array}{c} [\{-\sin\theta_2(p_x\cos\theta_1 + p_y\sin\theta_1 - a_1) + \\ \cos\theta_2(p_z - d_1)\} - d_3] - d_5 \end{array} \\ -\sin\theta_3\{\cos\theta_2(p_x\cos\theta_1 + p_y\sin\theta_1 - a_1) + \sin\theta_2(p_z - d_1)\} + \cos\theta_3(-p_x\sin\theta_1 + p_y\cos\theta_1) \\ -\sin\theta_4 \begin{array}{c} [\cos\theta_3\{\cos\theta_2(p_x\cos\theta_1 + p_y\sin\theta_1 - a_1) + \\ \sin\theta_2(p_z - d_1)\} + \\ \sin\theta_3(-p_x\sin\theta_1 + p_y\cos\theta_1)] \end{array} + \cos\theta_4 \begin{array}{c} [\{-\sin\theta_2(p_x\cos\theta_1 p_y\sin\theta_1 - a_1) + \\ \cos\theta_2(p_z - d_1)\} - d_3] \end{array} \end{bmatrix}$$

Next, the angle of the fifth joint $J_5$ is calculated by Expression (20) from the calculated y component and the z component of the hand 12, and the angle of the sixth joint $J_6$ is calculated by Expression (21) from the x, y, and z components.

$$\theta_5 = \arctan\left(\frac{p'_y}{p'_z}\right) \tag{20}$$

$$\theta_6 = \arccos\left(\frac{p'_x}{|\vec{p'}|}\right) = \arccos\left(\frac{p'_x}{\sqrt{p'^2_x + p'^2_y + p'^2_z}}\right) \tag{21}$$

In addition, regarding $\theta_5$ and $\theta_6$, Expressions (22) to (23) may also express the joint angles of the fifth joint $J_5$ and the sixth joint $J_6$. Here, in the actual control process, the joint angles are appropriately selected to command the robot.

$$\theta_5 = \arctan\left(\frac{p'_y}{p'_z}\right) - \pi \tag{22}$$

$$\theta_6 = -\arccos\left(\frac{p'_x}{|\vec{p'}|}\right) = -\arccos\left(\frac{p'_x}{\sqrt{p'^2_x + p'^2_y + p'^2_z}}\right) \tag{23}$$

Calculation Order 4 in Inverse Kinematics

Using the obtained angles of the first joint $J_1$, the second joint $J_2$, the third joint $J_3$, the fourth joint $J_4$, the fifth joint $J_5$, and the sixth joint $J_6$, a unit vector $n_0$ ($n_0$ is provided with an arrow indicating a vector in the formulas, and the same applies hereinafter) when the seventh joint $J_7$ is at 0 degrees is calculated by Expression (24).

$$\vec{n}_0 = \begin{bmatrix} ((-(c_1c_2c_3 - s_1s_3)s_4 - c_1s_2c_4)c_5 + (-c_1c_2s_3 - s_1c_3)s_5)c_6 + (-(c_1c_2c_3 - s_1s_3)c_4 + c_1s_2s_4)s_6 \\ ((-(s_1c_2c_3 + c_1s_3)s_4 - s_1s_2c_4)c_5 + (-s_1c_2s_3 + c_1c_3)s_5)c_6 + (-(s_1c_2c_3 + c_1s_3)c_4 + s_1s_2s_4)s_6 \\ ((-s_2c_3s_4 + c_2c_4)c_5 - s_2s_3s_5)c_6 + (-s_2c_3c_4 - c_2s_4)s_6 \end{bmatrix} \tag{24}$$

In Expression (24), $s_1, c_1, s_2, c_2, s_3, c_3, s_4, c_4, s_5, c_5, s_6, c_6$ are the abbreviations for $\sin\theta_1, \cos\theta_1, \sin\theta_2, \cos\theta 2, \sin\theta_3, \cos\theta_3, \sin\theta_4, \cos\theta_4, \sin\theta_5, \cos\theta_5, \sin\theta_6, \cos\theta_6$, respectively. In addition, Expression (24) is obtained from forward kinematics.

Next, the outer product of the calculated vector $n_0$ and the designated vector n is obtained by Expression (25), and the rotational direction is determined by whether the inner product of the obtained outer product and the designated vector b, which is obtained by Expression (26), is positive or negative.

$$\vec{v}_p = \vec{n}_0 \times \vec{n} = \begin{bmatrix} n_{0y}n_z - n_{0z}n_y \\ n_{0z}n_x - n_{0x}n_z \\ n_{0x}n_y - n_{0y}n_x \end{bmatrix} \tag{25}$$

$$s_{pp} = \vec{v}_p \cdot \vec{b} = v_{px}b_x + v_{py}b_y + v_{pz}b_z \tag{26}$$

Last, from the inner product of the vector $n_0$ just calculated and the designated vector n, which is obtained by Expression (27), an angle therebetween is obtained as the angle of the seventh joint $J_7$ by Expression (28).

$$s_p = \vec{n}_0 \cdot \vec{n} = n_{0x}n_x + n_{0y}n_y + n_{0z}n_z \tag{27}$$

$$\theta_7[1] = \begin{cases} \arccos(s_p)(s_{pp} \geq 0) \\ -\arccos(s_p)(s_{pp} < 0) \end{cases} \tag{28}$$

In addition, regarding $\theta_7$, from the geometrical symmetry, Expression (29) may also express the joint angle of the seventh joint $J_7$. Here, in the actual control process, the angle is appropriately selected to command the robot.

$$\theta_7[2] = \theta_7[1] - \tag{29}$$

In the above-described manner, 16 versions of the entire status of the robot 1002 shown in Table 1 may be analytically calculated and determined by inverse kinematics from the position and the posture of the hand 12 of the robot 1002 and the position (the offset angle value δ) corresponding to the elbow.

TABLE 1

| No. of solution | $\theta_1$ | $\theta_2$ | $\theta_3$ | $\theta_4$ | $\theta_5$ | $\theta_6$ | $\theta_7$ |
|---|---|---|---|---|---|---|---|
| 1 | (3) | (8) | (9) | (6) | (20) | (21) | (28) |
| 2 | (3) | (8) | (9) | (6) | (22) | (23) | (29) |
| 3 | (3) | (10) | (11) | (12) | (20) | (21) | (28) |
| 4 | (3) | (10) | (11) | (12) | (22) | (23) | (29) |
| 5 | (3) | (13) | (14) | (15) | (20) | (21) | (28) |
| 6 | (3) | (13) | (14) | (15) | (22) | (23) | (29) |
| 7 | (3) | (16) | (17) | (18) | (20) | (21) | (28) |
| 8 | (3) | (16) | (17) | (18) | (22) | (23) | (29) |
| 9 | (4) | (8) | (9) | (6) | (20) | (21) | (28) |
| 10 | (4) | (8) | (9) | (6) | (22) | (23) | (29) |
| 11 | (4) | (10) | (11) | (12) | (20) | (21) | (28) |
| 12 | (4) | (10) | (11) | (12) | (22) | (23) | (29) |
| 13 | (4) | (13) | (14) | (15) | (20) | (21) | (28) |
| 14 | (4) | (13) | (14) | (15) | (22) | (23) | (29) |
| 15 | (4) | (16) | (17) | (18) | (20) | (21) | (28) |
| 16 | (4) | (16) | (17) | (18) | (22) | (23) | (29) |

In the actual control process, from the joint angles of the 16 ways shown in Table 1, the joint angles are appropriately selected to command the robot in consideration of the movable ranges of the joints, the positional relationship between an obstacle and the robot, and the like. The calculation order described here is an example, and which one of case classifications and arc cosine, arc sine, and arc tangent of trigonometric functions is used to obtain the joint angles is not limited to the above-described order.

In addition, calculation through such inverse kinematics may be performed, for example, whenever the robot control unit 1021 controls the robot 1002, and typically, inverse kinematics calculation is performed in every control process. However, the calculation is performed in advance and is stored in a memory to allow reading of the results in every control process.

As an example, analysis expressions are obtained off-line in advance by inverse kinematics and are stored in the storage unit 1012, and the robot control unit 1021 may calculate the angle of each of the joints using the analysis expressions.

Figure 3:
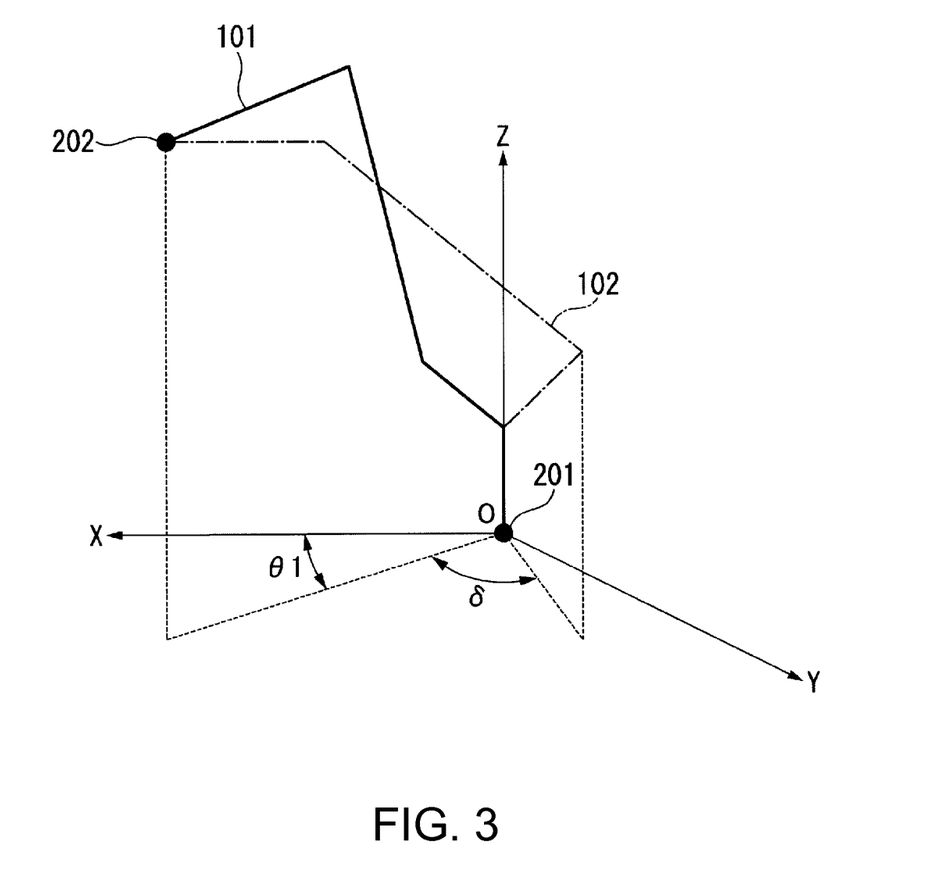
FIG. 3 is a diagram illustrating an offset angle value which is a variable.

FIG. 3 is a diagram illustrating the offset angle value δ which is a variable.

The XYZ coordinate system shown in FIG. 3 is a coordinate system of the base coordinates.

In FIG. 3, a point 201 (in the example of FIG. 3, the origin O) represents a root point of the base a0 included in the robot 1002.

In FIG. 3, a point 202 represents the wrist included in the robot 1002.

In FIG. 3, a robot status 101 represents the robot status when it is assumed that there is no offset in a case where the point 201 and the point 202 are fixed. Here, the angle of the first joint is θ1.

In FIG. 3, a robot status 102 represents the robot status when it is assumed that an offset angle value δ is present in the case where the point 201 and the point 202 are fixed. Here, the angle of the first joint is (θ1+δ).

In this embodiment, the angle δ between a straight line obtained by projecting a straight line connecting the origin and the fourth axis (the turning axis A4) onto the base coordinates and a straight line obtained by projecting a straight line connecting the origin and the sixth axis (the turning axis A6) onto the base coordinates is used as a variable (the offset angle value δ) that explicitly designates the position of the fourth axis (the turning axis A4) corresponding to the elbow.

In addition, in this embodiment, the offset angle value δ is used as the variable that designates the position corresponding to the elbow (the position of the elbow). However, for example, a variable defined by other methods may also be used as long as the same thing is indirectly specified.

As described above, in the robot control device 1001 of the robot system according to this embodiment, for the 7-axis robot 1002 that includes the offset structure (the offset portion 11) between the first axis (the rotating axis A1) and the second axis (the turning axis A2), conditions of the status of the vertical articulated robot in accordance with the instructions for the position and the posture of the hand 12 of the robot 1002 and the instructions for the position (the offset angle value δ) corresponding to the elbow, and information (control information) for controlling the entire status of the robot 1002 (in this embodiment, the angles of the rotating axes A1, A3, A5, and A7 and the turning axes A2, A4, and A6 of the robot 1002) such that the conditions are met are stored in the storage unit 1012 to match each other. The robot control unit 1021 controls the entire status of the robot 1002 according to the instructions for the position and the posture of the hand 12 of the robot 1002 and the instructions for the position corresponding to the elbow (the offset angle value δ) on the basis of the control information stored in the storage unit 1012 so as to meet the conditions of the status of the vertical articulated robot in accordance with the instructions.

As such, in the robot control device 1001 of the robot system according to this embodiment, for the vertical articulated robot having 7 axes and the offset structure, conditions (a total of 7 variables) of the status of the vertical articulated robot including the position of the elbow (a single variable) in the vertical articulated robot and control information for controlling the robot 1002 such that the conditions are satisfied are stored in the storage unit 1012 to match each other, the conditions of the status of the vertical articulated robot including the position of the elbow are input to the input unit 1013, and the robot control unit 1021 controls the robot 1002 such that the input conditions are satisfied on the basis of the control information stored in the storage unit 1012 to match the same conditions as the conditions input to the input unit 1013.

According to the robot control device 1001 of the robot system according to this embodiment, by introducing and using the variable (the offset angle value δ) that explicitly designates the position corresponding to the elbow, a wide movable range is ensured, avoiding a singular point or an obstacle is performed, and a high-speed operation may be realized in a state where an arbitrary position and a posture of the hand 12 of the robot 1002 are controlled.

In the robot control device 1001 of the robot system according to this embodiment, by using the variable (the offset angle value δ) that explicitly designates the position corresponding to the elbow, for example, the status of the robot 1002 may be intuitively instructed by the user, and thus the ease of controlling may be enhanced.

In the robot control device 1001 of the robot system according to this embodiment, the robot 1002 that has 7 joints like humans do is controlled. Therefore, in the robot control device 1001 of the robot system according to this embodiment, for the robot 1002, for example, the position of the elbow may be changed while, for example, the hand 12 and the shoulder are stopped, and accordingly, it is possible to perform an operation while avoiding an obstacle by adjusting the position of the elbow.

In the robot control device 1001 of the robot system according to this embodiment, the robot 1002 having the offset structure (the offset portion 11) is controlled. Therefore, in the robot control device 1001 of the robot system according to this embodiment, for the robot 1002, for example, an operation region is made asymmetric by the offset structure, and operability of a particular region may be increased. In addition, the degree of freedom may be increased when the structure of an arm is designed. In the robot 1002 having the offset structure, generally, compared to a robot that does not have an offset structure, there are advantages that a posture that exerts a force while unfolding the elbow to extend to hold a distant object is realized, and the like.

Second Embodiment

A second embodiment of the invention will be described in detail with reference to the drawings.

In the first embodiment, as illustrated in FIG. 2, the case of controlling the robot having the offset structure (the offset portion 11) between the first axis (rotating axis A1) and the second axis (turning axis A2) has been described. However, in this embodiment, as illustrated in FIG. 4, a case of controlling a robot having an offset structure (offset portion 21) between a sixth axis (turning axis A6) and a seventh axis (rotating axis A7) will be described.

Here, the schematic configurations and operations of a robot system according to this embodiment are the same as the configurations and operations of the robot system illustrated in FIG. 1 according to the first embodiment. Therefore, this embodiment will be described using reference numerals shown in FIG. 1.

Figure 4:
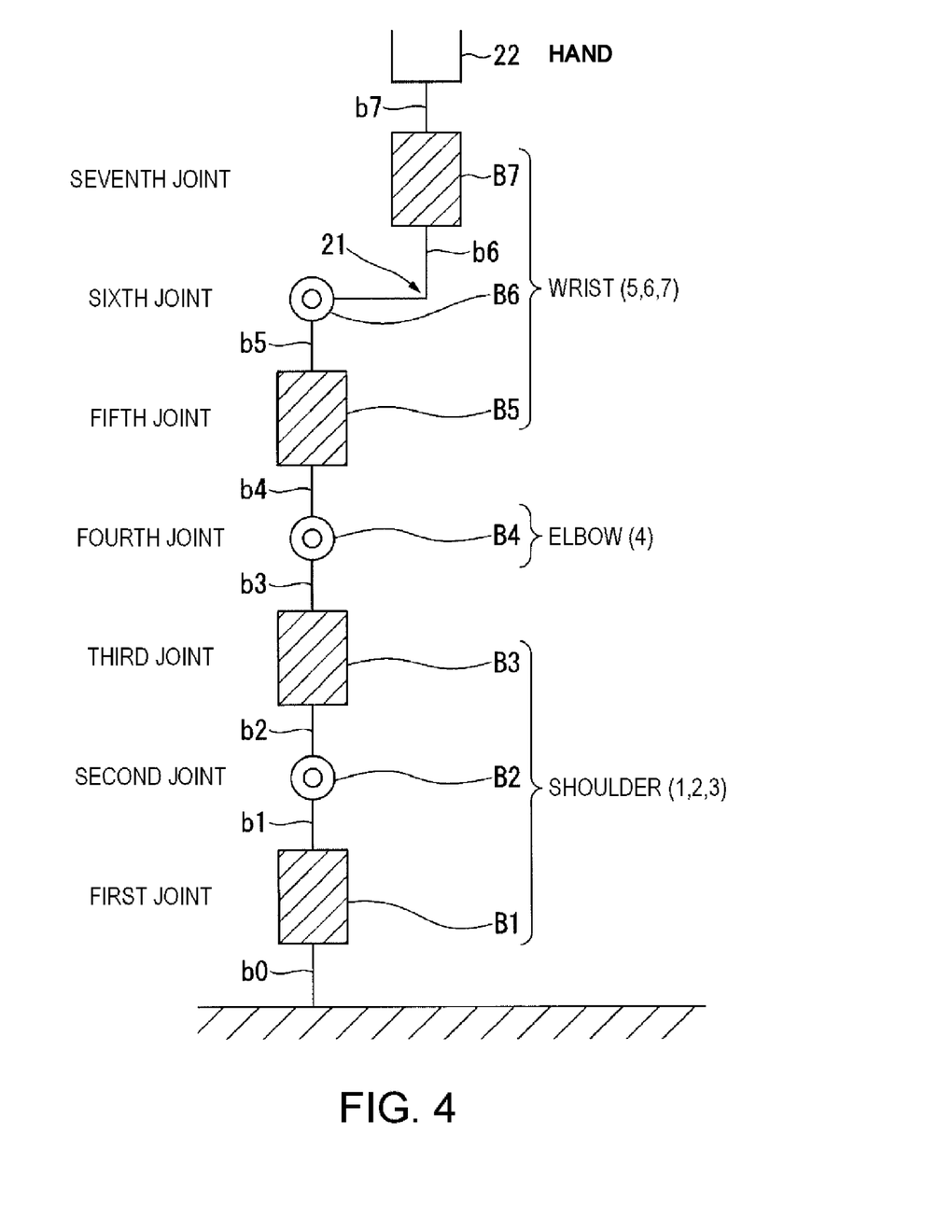
FIG. 4 is a schematic block diagram illustrating a configuration example of a 7-axis robot having an offset structure according to a second embodiment.

FIG. 4 is a schematic block diagram illustrating a configuration example of a 7-axis (7 degrees of freedom) robot 1002 having an offset structure according to this embodiment.

The robot 1002 according to this embodiment is configured by connecting a base b0, a rotating axis B1 corresponding to a first joint, a first link b1, a turning axis B2 corresponding to a second joint, a second link b2, a rotating axis B3 corresponding to a third joint, a third link b3, a turning axis B4 corresponding to a fourth joint, a fourth link b4, a rotating axis B5 corresponding to a fifth joint, a fifth link b5, a turning axis B6 corresponding to a sixth joint, a sixth link b6, a rotating axis B7 corresponding to a seventh joint, a seventh link b7, and a hand 22.

The first joint, the second joint, and the third joint constitute a part of the shoulder.

The fourth joint constitutes a part of the elbow.

The fifth joint, the sixth joint, and the seventh joint constitute a part of the wrist.

Here, the base b0 and each of the links b1 to b7 are stationary.

In addition, the base b0, the first link b1, the second link b2, the third link b3, the fourth link b4, the fifth link b5, and the seventh link b7 have linear shapes.

In addition, in this embodiment, the sixth link b1 has a shape bent at approximately 90 degrees at one point. This part is an offset portion 21 having an offset structure.

Each of the rotating axes B1, B3, B5, and B7 is able to rotate about a straight line connecting the links connected above and below in FIG. 4 as a center axis.

Each of the turning axes B2, B4, and B6 is able to turn (rotate) about a straight line from the front to the rear (or a straight line from the rear to the front) in FIG. 4 as a center axis.

In addition, the center axis (turning axis) of each of the rotating axes B2, B4, and B6 is orthogonal to the center axis (rotational axis) of each of the rotating axes B1, B3, B5, and B7.

When all the angles (7 angles) of the rotating axes B1, B3, B5, and B7 and the turning axes B2, B4, and B6 are determined, the entire status of the robot 1002 is determined.

Here, variables (parameters) that control the robot 1002 are not necessarily the 7 angles, and arbitrary variables that directly or indirectly specify all the 7 angles may be used.

In this embodiment, a control method of controlling the angles of the rotating axes B1, B3, B5, and B7 and the turning axes B2, B4, and B6 of the robot 1002 to meet instructions for the position and the posture (6 variables) of the hand 22 of the robot 1002 and instructions for the position (a single variable) corresponding to the elbow is used.

Specifically, in the robot control device 1001, in advance, conditions of the status of the vertical articulated robot in accordance with the instructions for the position and the posture of the hand 22 of the robot 1002 and the instructions for the position corresponding to the elbow, and information (control information) for controlling the angles of the rotating axes B1, B3, B5, and B7 and the turning axes B2, B4, and B6 of the robot 1002 to meet the conditions are stored in the storage unit 1012 to match each other.

The robot control unit 1021 controls the angles of the rotating axes B1, B3, B5, and B7 and the turning axes B2, B4, and B6 of the robot 1002 according to the instructions for the position and the posture of the hand 22 of the robot 1002 and the instructions for the position corresponding to the elbow on the basis of the control information stored in the storage unit 1012 so as to meet the conditions of the status of the vertical articulated robot in accordance with the instructions.

In addition, in this embodiment, a variable (offset angle value δ) that explicitly designates the position corresponding to the elbow is defined for the robot 1002 having the offset structure on the wrist side as illustrated in FIG. 4. For this, for example, by applying the same method as in the case of the first embodiment to the case of this embodiment, it is possible to define the variable (offset angle value δ) that explicitly designates the position corresponding to the elbow. In addition, in the second embodiment, the shoulder and the position are exchanged with those of the first embodiment. Therefore, the offset angle value δ is also changed to the position of the elbow with respect to the wrist from the position of the elbow with respect to the shoulder.

In addition, in this embodiment, as illustrated in FIG. 4, inverse kinematics is applied to the robot 1002 having the offset structure on the wrist side. For this, for example, by applying the same method as in the case of the first embodiment to the case of this embodiment, it is possible to obtain a solution by inverse kinematics.

Specifically, in the structure of the 7-axis robot having the offset structure (the offset portion 11) on the shoulder side as illustrated in FIG. 2 according to the first embodiment and in the structure of the 7-axis robot having the offset structure (the offset portion 21) on the wrist side as illustrated in FIG. 4 according to the this embodiment, schematically, the first to seventh joints illustrated in FIG. 2 respectively correspond to the seventh to first joints illustrated in FIG. 4.

As described above, in the robot control device 1001 of the robot system according to this embodiment, for the 7-axis robot 1002 that includes the offset structure (the offset portion 21) between the sixth axis (the turning axis B6) and the seventh axis (the rotating axis B7), conditions of the status of the vertical articulated robot in accordance with the instructions for the position and the posture of the hand 22 of the robot 1002 and the position (the offset angle value δ) corresponding to the elbow, and information (control information) for controlling the entire status of the robot 1002 (in this embodiment, the angles of the rotating axes B1, B3, B5, and B7 and the turning axes B2, B4, and B6 of the robot 1002) to meet the conditions are stored in the storage unit 1012 to match each other. The robot control unit 1021 controls the entire status of the robot 1002 according to the instructions for the position and the posture of the hand 22 of the robot 1002 and the instructions for the position corresponding to the elbow (the offset angle value δ) on the basis of the control information stored in the storage unit 1012 so as to meet the conditions of the status of the vertical articulated robot in accordance with the instructions.

As such, in the robot control device 1001 of the robot system according to this embodiment, for the vertical articulated robot having 7 axes and the offset structure, conditions (a total of 7 variables) of the status of the vertical articulated robot including the position of the elbow (a single variable) in the vertical articulated robot and control information for controlling the robot 1002 such that the conditions are satisfied are stored in the storage unit 1012 to match each other, the conditions of the status of the vertical articulated robot including the position of the elbow are input to the input unit 1013, and the robot control unit 1021 controls the robot 1002 such that the input conditions are satisfied on the basis of the control information stored in the storage unit 1012 to match the same conditions as the conditions input to the input unit 1013.

According to the robot control device 1001 of the robot system according to this embodiment, the same effects as those in the case of the first embodiment may be obtained for the robot 1002 having the offset structure on the wrist side.

For example, according to the robot control device 1001 of the robot system according to this embodiment, by introducing and using the variable (the offset angle value δ) that explicitly designates the position corresponding to the elbow, a wide movable range is ensured, avoiding a singular point or an obstacle is performed, and a high-speed operation may be realized in a state where an arbitrary position and a posture of the hand 22 of the robot 1002 are controlled.

In the robot control device 1001 of the robot system according to this embodiment, by using the variable (the offset angle value δ) that explicitly designates the position corresponding to the elbow, for example, the status of the robot 1002 may be intuitively instructed by the user, and thus ease of controlling may be enhanced.

Embodiments according to Modification Examples of the above embodiments will now be described.

Figure 5:
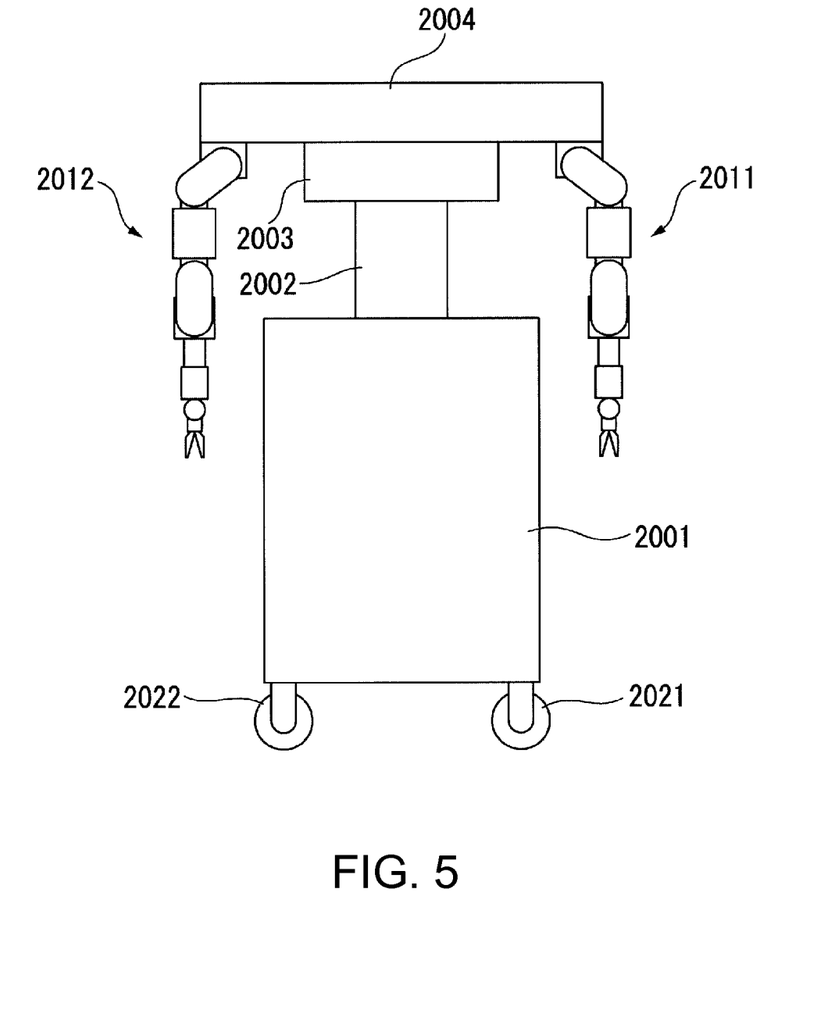
FIG. 5 is a diagram illustrating an example of the external form of a robot system according to a modification example of the embodiment of the invention.

FIG. 5 is a diagram illustrating an example of the external form of a robot system according to a modification example of the embodiment of the invention.

FIG. 5 illustrates the example of the external form of the robot system according to this modification example viewed from the front. Therefore, the right side of FIG. 5 corresponds to the left of the robot system according to this modification example, and the left side of FIG. 5 corresponds to the right of the robot system according to this modification example.

The robot system according to this modification example includes a base unit 2001, members (torso members) 2002, 2003, and 2004 that constitute the torso, robots 2011 and 2012 that constitute the arm, and wheels 2021 and 2022.

The robot system according to this modification example is constituted by mounting the torso member 2002, the torso member 2003, and the torso member 2004 to the upper surface of the base unit 2001 in this order on the upper side, mounting the robot 2011 that constitutes the left arm to the left of the torso member 2004 which is the uppermost portion, mounting the robot 2012 that constitutes the right arm to the right of the torso member 2004 which is the uppermost portion, mounting the wheel 2021 to the left of the bottom surface of the base unit 2001, and mounting the wheel 2022 to the right of the bottom surface of the base unit 2001.

Here, the robot system according to this modification example includes the robot 2011 that constitutes the left arm and the robot 2012 that constitutes the right arm, that is, includes both arms as such.

Each of the robots 2011 and 2012 that constitutes the corresponding arm is configured from, for example, the robot having the vertical articulated robot illustrated in FIG. 2 and the robot having the vertical articulated robot illustrated in FIG. 4.

In addition, the robot system according to this modification example includes the left wheel 2021 and the right wheel 2022, that is, includes both wheels.

In addition, the robot system according to this modification example is able to be moved by rotating the wheels 2021 and 2022 using man power.

In the robot system according to this modification example, a robot control device is stored and included inside the base unit 2001.

The robot control device has the same function as that of, for example, the robot control device 1001 illustrated in FIG. 1 and controls the robot 2011 of the left arm corresponding to the robot 1002 illustrated in FIG. 1 and the robot 2012 of the right arm corresponding to the robot 1002 illustrated in FIG. 1.

Here, for example, the robot control device may simultaneously control the robot 2011 of the left arm and the robot 2012 of the right arm in association with each other, or may control the robot 2011 of the left arm and the robot 2012 of the right arm separately from each other.

As described above, in the robot system according to this modification example, for example, the robot control device 1001 illustrated in FIG. 1 and those corresponding to the robot 1002 (in the robot system according to this modification example, the robot control device included in the base unit 2001 and the two robots 2011 and 2012) are configured in one body.

In addition, the robot control device included in the base unit 2001 and each of the robots 2011 and 2012 are connected to be able to communicate with each other through control signals or the like via, for example, a wire cable or wirelessly.

Here, as another configuration example, it is possible to provide apart of the functions of the robot control device included in the base unit 2001 to a controller separate from the robot system illustrated in FIG. 5.

As a specific example, the same functions as the functions of the input unit 1013 and the output unit 1014 included in the robot control device 1001 illustrated in FIG. 1 are included in a controller separate from the robot system illustrated in FIG. 5, and a function for causing the robot control device included in the base unit 2001 and the controller to wirelessly communicate with each other is provided, thereby realizing the same functions as the functions of the input unit 1013 and the output unit 1014 included in the robot control device 1001 illustrated in FIG. 1 as a remote controller.

CONCLUSION OF THE ABOVE EMBODIMENTS

While the embodiments of the invention have been described above in detail with reference to the drawings, specific configurations are not limited to the embodiments, and designs in a range that does not depart from the gist of the invention and the like are also included.

In addition, programs for realizing the functions of arbitrary configuration units in the robot control device 1001 described above may be recorded in a computer-readable recording medium, and the programs may be read and executed by a computer system. In addition, the "computer system" mentioned here includes an OS (Operating System) or hardware such as peripheral devices. In addition, the "computer-readable recording medium" referred to is a storage device including portable media such as a flexible disk, a magneto-optical disk, a ROM (Read Only Memory), or a CD (Compact Disc)-ROM, hard disks embedded in a computer system, and the like. Moreover, the "computer-readable recording medium" also includes those that hold programs for a predetermined time like a RAM (Random Access Memory) in a computer system that is a server or a client in a case where programs are transmitted via a network such as the Internet or a communication line such as a telephone line.

In addition, the programs may also be transmitted from a computer system that stores the programs in a storage device or the like to another computer system via a transmission medium or transmission waves in the transmission medium. Here, the "transmission medium" that transmits the programs is referred to as a medium having a function of transmitting information like a network (communication network) such as the Internet or a communication line such as a telephone line.

In addition, the programs may be programs for realizing a part of the above-described functions. Moreover, the programs may be those that are realized by a combination with programs that record the above-described functions in a computer system in advance, that is, a so-called differential file (differential program).

The entire disclosure of Japanese Patent Application No. 2012-031848 filed Feb. 16, 2012 is expressly incorporated by reference herein.

What is claimed is:

1. A robot control device which controls a vertical articulated robot having a plurality of axes and an offset structure, comprising:

a storage unit which stores a condition of a status including a position of an elbow in the vertical articulated robot and control information that satisfies the condition of the status to match each other;

an input unit operable by a user to input a desired condition of a status; and a robot control unit which performs control based on the control information associated with the condition of the status that satisfies the desired condition of the status inputted by the user via the input unit, wherein the control information is information for controlling at least one rotating axis and at least one turning axis of the vertical articulated robot.

2. The robot control device according to claim 1, wherein the condition of the status is a condition that designates a position and a posture of a hand and the position of the elbow in the vertical articulated robot.

3. The robot control device according to claim 1, wherein the offset structure is between a first axis of the vertical articulated robot and a second axis of the vertical articulated robot.

4. The robot control device according to claim 1, wherein the offset structure is between a sixth axis of the vertical articulated robot and a seventh axis of the vertical articulated robot.

5. A robot control method of a vertical articulated robot having a plurality of axes and an offset structure, comprising:

storing a condition of a status including a position of an elbow in the vertical articulated robot and control information that satisfies the condition of the status in a storage unit to match each other, wherein the control information is information for controlling at least one rotating axis and at least one turning axis of the vertical articulated robot;

inputting, by a user, a desired condition of a status to an input unit; and controlling the vertical articulated robot such that the desired condition of the status is satisfied based on the control information associated with the condition of the status that matches the desired condition of the status inputted.

6. A robot control program which causes a computer to execute:

storing a condition of a status including a position of an elbow in a vertical articulated robot and control information that satisfies the condition of the status in a storage unit to match each other, wherein the control information is information for controlling at least one rotating axis and at least one turning axis of the vertical articulated robot;

inputting, by a user, a desired condition of a status to an input unit; and controlling the vertical articulated robot having a plurality of axes and an offset structure such that the desired condition of the status is satisfied based on the control information associated with the condition of the status that matches the desired condition of the status inputted.

7. A robot system comprising:

a vertical articulated robot having a plurality of axes and an offset structure; and a robot control device which controls the vertical articulated robot, wherein the robot control device includes:

a storage unit which stores a condition of a status including a position of an elbow in the vertical articulated robot and control information that satisfies the condition of the status to match each other, wherein the control information is information for controlling at least one rotating axis and at least one turning axis of the vertical articulated robot, an input unit operable by a user to input a desired condition of a status, and a robot control unit which performs control such that the desired condition inputted is satisfied based on the control information stored in the storage unit for the condition that matches the desired condition.

8. A robot control device comprising:

an input unit to which a condition of a status including a position of an elbow in a vertical articulated robot having a plurality of axes and an offset structure is input; and a robot control unit which controls the vertical articulated robot such that the condition input to the input unit is satisfied.

9. A robot control method comprising:

controlling a vertical articulated robot such that a condition input to an input unit to which the condition of a status of the vertical articulated robot including a position of an elbow in the vertical articulated robot having a plurality of axes and an offset structure is input is satisfied, by a robot control unit.

10. A robot control program which causes a computer to execute:

controlling a vertical articulated robot such that a condition input to an input unit to which the condition of a status of the vertical articulated robot including a position of an elbow in the vertical articulated robot having a plurality of axes and an offset structure is input is satisfied, by a robot control unit.

11. A robot system comprising:

a vertical articulated robot having a plurality of axes and an offset structure; and a robot control device which controls the vertical articulated robot, wherein the robot control device includes:

an input unit to which a condition of a status including a position of an elbow in the vertical articulated robot is input, and a robot control unit which controls the vertical articulated robot such that the condition input to the input unit is satisfied.

* * * * *